United States Patent [19]

Robirds et al.

[11] Patent Number: 4,814,942
[45] Date of Patent: Mar. 21, 1989

[54] DRAWOUT SWITCHGEAR CELL FRAME

[75] Inventors: Timothy G. Robirds, Sumter, S.C.; John D. Petrisko, West Mifflin Boro, Pa.; Nagar J. Patel, Plum Boro, Pa.; William Q. Aglietti, Penn Hills Township, Allegheny County, Pa.

[73] Assignee: Westinghouse Electric Corp., Pittsburgh, Pa.

[21] Appl. No.: 83,406

[22] Filed: Aug. 10, 1987

[51] Int. Cl.$^4$ .............................. H02B 11/00
[52] U.S. Cl. ..................... 361/337; 361/336; 361/390; 361/429; 200/50 AA; 312/257 SK
[58] Field of Search ............ 200/50 AA; 312/257 R, 312/258 SK; 361/336–339, 342, 347, 350, 390–391, 429; 220/4 F, 4 R, 84

[56] References Cited

U.S. PATENT DOCUMENTS

| 1,492,309 | 4/1929 | Ogden | 361/429 |
| 2,167,525 | 7/1939 | Rosendale | 312/257 R |
| 2,196,399 | 11/1937 | Rubel | 162/39 H |
| 3,353,854 | 4/1965 | Hansen | 403/171 |
| 4,650,085 | 3/1987 | Davies et al. | 220/4 R |

FOREIGN PATENT DOCUMENTS

| 2459676 | 6/1976 | Fed. Rep. of Germany | 361/429 |
| 0894728 | 4/1962 | United Kingdom | 361/429 |

Primary Examiner—A. D. Pellinen
Assistant Examiner—Gregory D. Thompson
Attorney, Agent, or Firm—M. J. Moran

[57] ABSTRACT

A drawout switchgear apparatus is characterized by a cell having a front opening through which a circuit breaker is movable on tracks into and out of the cell for engagement and disengagement with electrical terminals within the cell. A cell frame includes formed columns at outside corners members, cross-strut members, and formed horizontal members which members are of similar cross-section of a substantially U-shape with U-legs and a bight and with a laterally extending flange. Each member converges to form junction corners where they are fastened together. A track extension and interlock cooperate to facilitate removal and retention of the unit into and out of the cell.

10 Claims, 6 Drawing Sheets

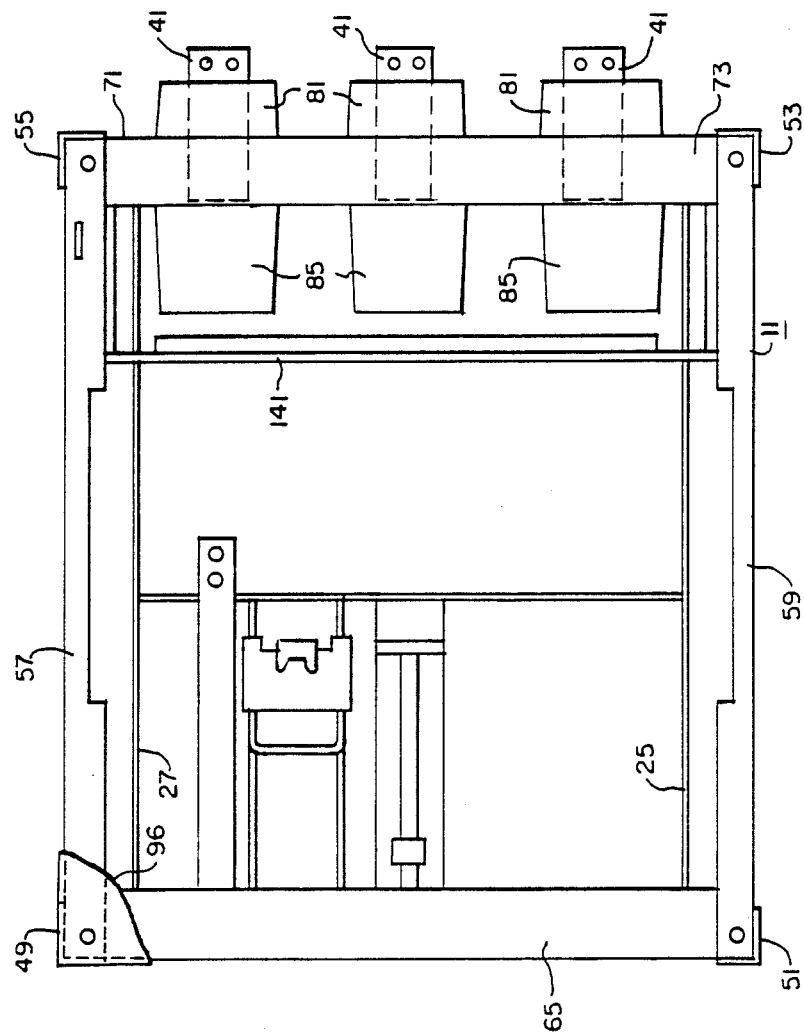

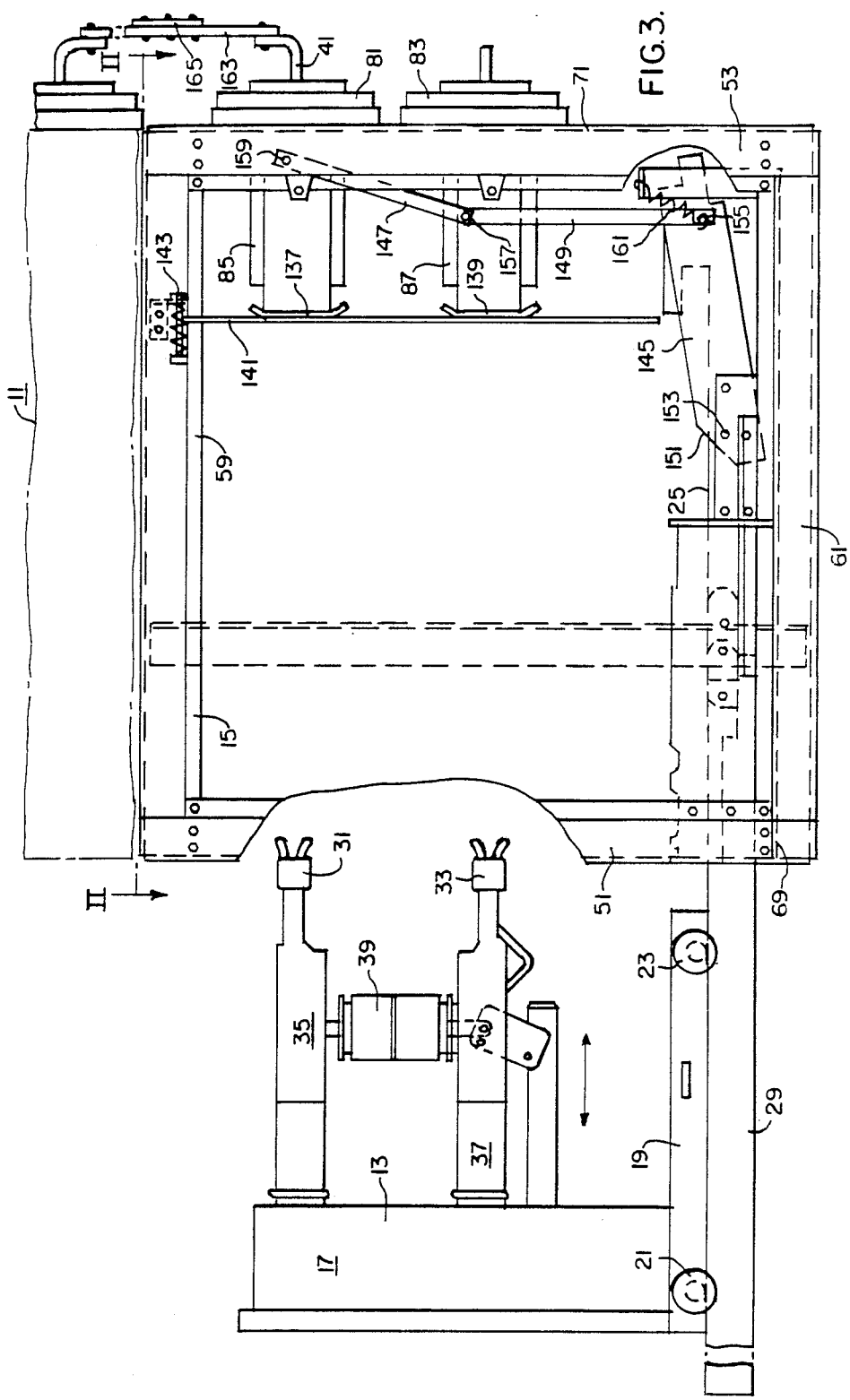

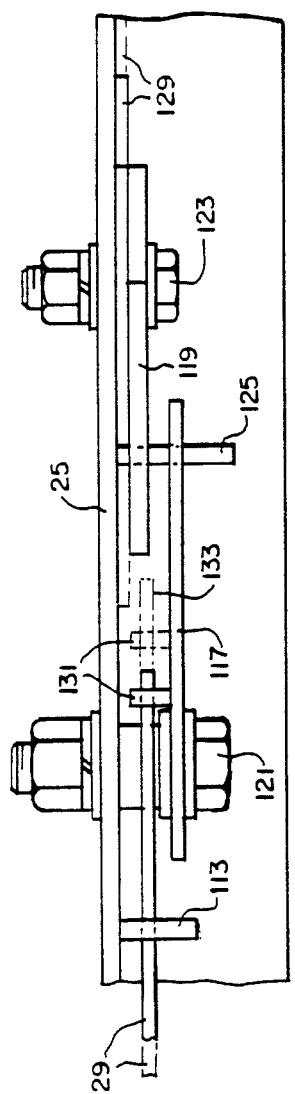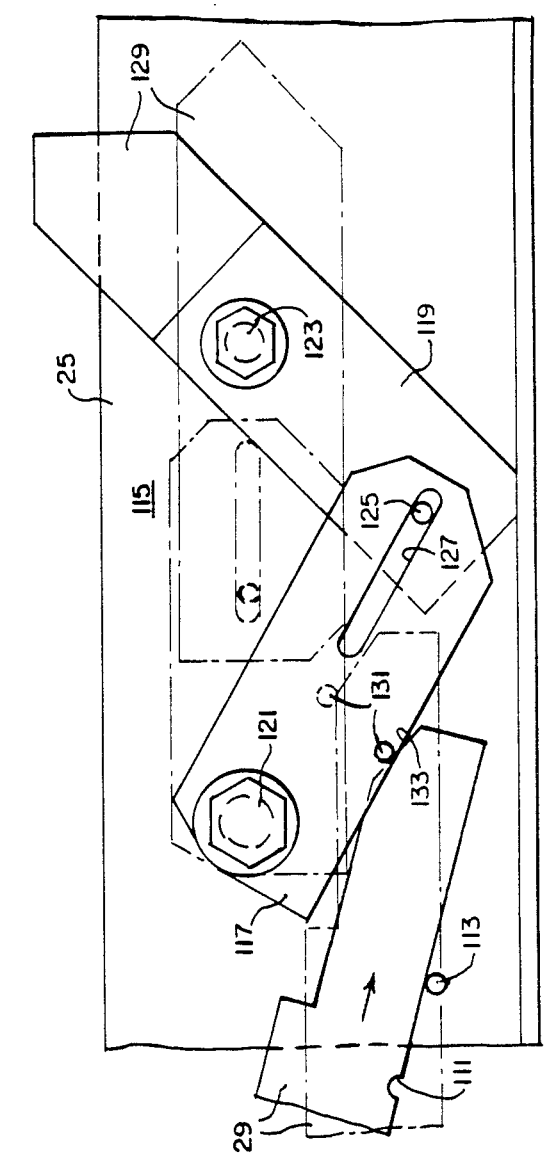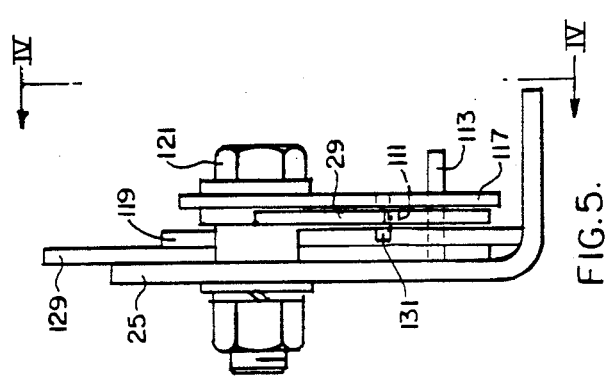

DRAWOUT SWITCHGEAR CELL FRAME

BACKGROUND OF THE INVENTION

1. Field of the Invention

This invention relates to switchgear assemblies equipped with drawout devices, specifically in this case being circuit breakers, and, more particularly, it pertains to a rigid frame structure for use in such switchgear assemblies.

2. Description of the Prior Art

Electrical switchgear apparatus, such as circuit breakers and other circuit interrupters, are preferably enclosed within cells or metal-clad cubicles for the safety of personnel as well as for the switchgear apparatus. This is particularly true for switchgear apparatus of the drawout type which is heavy and therefore requires auxiliary means for drawing the switchgear apparatus into and out of the cubicle. Due to the weights of the switchgear and the auxiliary means, considerable stresses are developed. For that reason framework assemblies must comprise rigid corners formed by elongated members or struts, such as shown in U.S. Pat. Nos. 2,167,525; 2,196,399; 3,353,854; and 4,650,085 which disclose the use of supplementary parts for reinforcing the corners which is costly.

Associated with the foregoing is a need for compactness. This can be achieved by reducing the clearance spaces between the cell and the drawout switchgear circuit breaker. The primary limitation on compactness is the front opening of the cell through which the drawout circuit breaker moves into and out of the cell. Heretofore, the corners of such openings have been reinforced by additional parts or squaring members which are costly and, if in the form of gussets, require a larger front opening to accommodate the movement of the switchgear.

SUMMARY OF THE INVENTION

The drawout switchgear apparatus of this invention comprises a cell having a front opening and stationary tracks within the cell that extend from the front opening. Stationary terminals are supported within the cell, and a circuit breaker unit is movable into and out of the cell through the front opening on rollers on the stationary tracks. Movable terminals are mounted on the unit and are movable with the unit between connected and disconnected positions of the stationary terminals. The cell comprises formed column members disposed at outside corners thereof, formed cross-strut members; and formed horizontal members. The members have similar cross-sections of a substantially U-shape including U-legs and a bight and have a laterally extending flange on one leg thereof. An end portion of each of the formed column members, cross-strut member, and horizontal member converge with one another to form a junction point or corner with fastening means for securing the members together at the junction point. The flange extends in a direction away from the other leg. Each member comprises end surfaces with the end surfaces of a first member being in abutment with the bight of a second member. The end surface of a second member is in abutment with the U-leg of a third member and the U-leg of the first member is in abutment with the U-leg of the third member. The fastening means comprises a bolt and nut assembly with the abutting U-legs of the first and third members being secured together. The laterally extending flanges of the second and third members are secured together with the flange of the first member and the U-leg of the second member being secured together. A track extension detachably mounted on the track and extends through the front opening so that the unit may be removed from the cell. An interlock is retractably mounted on the track for blocking removal of the switchgear unit out of the cell when the track extension is removed from the track. Interlocking means are disposed between the interlock and the track extension for mounting and dismounting the interlock when the track extension is respectively installed and removed from the track. The interlock comprises a body movable by the track extension into the path of movement of the unit when the track extension is removed.

The advantage of the device of this invention is that it provides a relatively compact structural subassembly for a drawout switchgear circuit breaker which may be easily integrated into a particular manufacturers complete equipment design.

BRIEF DESCRIPTION OF THE DRAWINGS

FIG. 2 is a plan view taken on the line II—II of FIG. 3 and showing the cell.

FIG. 3 is a side elevational view of a drawout switchgear cell frame showing a circuit breaker in the withdrawn position and supported on extension rails.

FIG. 4 is an enlarged side elevational view of a rail interlock for preventing removal of the circuit breaker from the cell, taken on the line IV—IV of FIG. 5.

FIG. 5 is an end view of the assembly shown in FIG. 4.

FIG. 6 is a plan view of the assembly shown in FIG. 4.

DESCRIPTION OF THE PREFERRED EMBODIMENT

Figure 1:
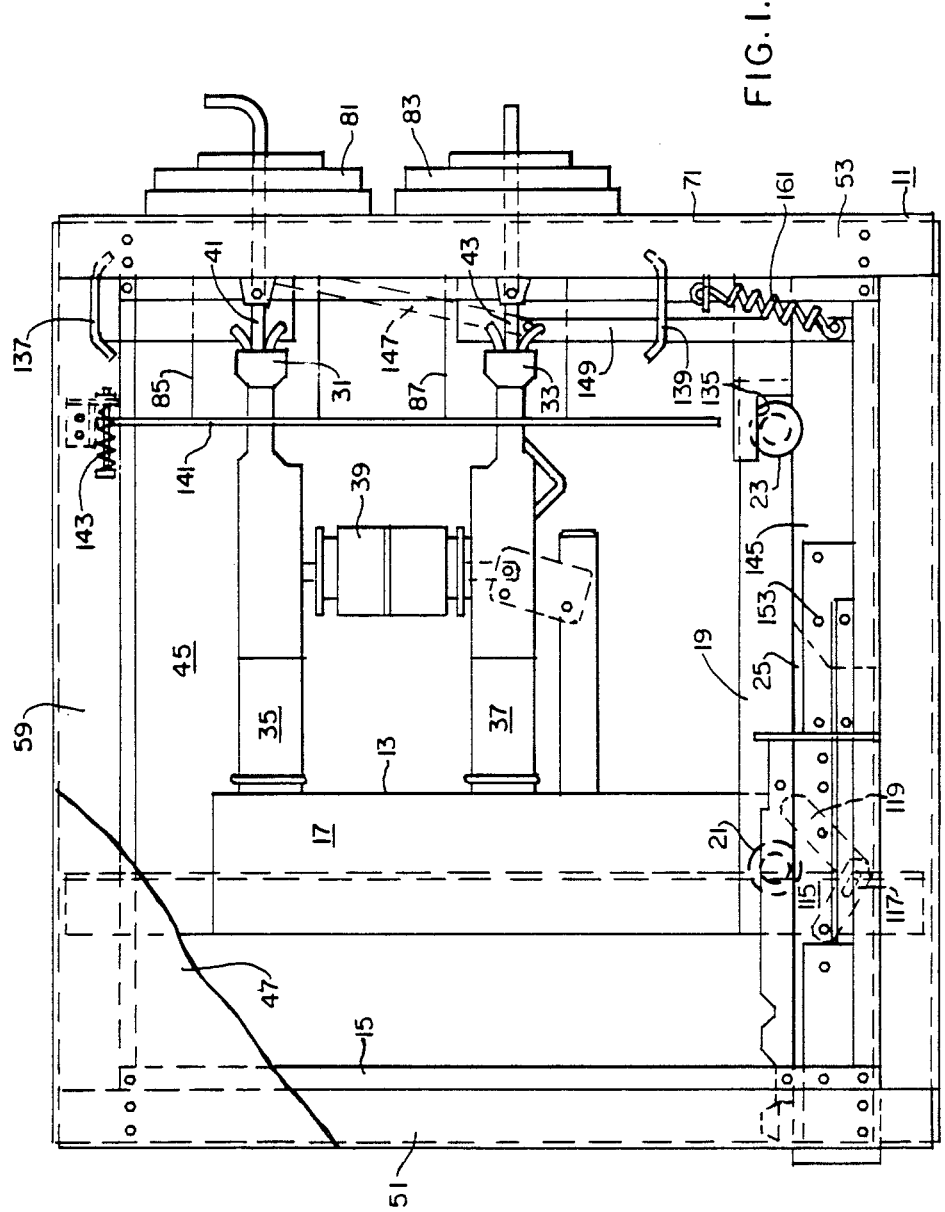
FIG. 1 is a side elevational view showing a drawout switchgear cell frame with a circuit breaker completely installed within the cell frame.

A drawout switchgear is generally indicated at 11 in the drawings and it comprises a circuit interrupter or circuit breaker 13 which is mounted in a sheet metal cubical or cell 15. Generally, the circuit breaker is of the type and operation shown in U.S. Pat. Nos. 3,483,338 and 3,920,939 and it includes, but is not limited to, a circuit breaker of the vacuum circuit interrupter type, such as disclosed in U.S. Pat. Nos. 3,958,093 and 4,351,990. The circuit breaker 13 includes a housing 17 which is supported between and on a pair of similar spaced members 19, one of which is shown in FIG. 3. A pair of wheels or rollers 21, 23 roll upon spaced rails 25, 27 (FIG. 2). Detachable rail extensions, one of which 29 is shown in FIG. 3, support the circuit breaker 13 in the retracted position (FIG. 3).

The circuit breaker 13 also includes a pair of movable terminals or disconnects 31, 33 for each phase of the switchgear 11 (FIGS. 1, 3). Terminals 31, 33 are supported on stand-off insulating supports 35, 37, respectively, which extend from and are supported on the breaker mechanism housing 17. A vacuum interrupter 39 is disposed between the insulating supports 35, 37 in a manner known in the art. Suffice it to say, a pair of separable contacts (not shown) are contained within the vacuum interrupter 39 and, in turn, are connected to 39 and are electrically connected to the movable disconnects 31, 33, respectively, that are supported by the stand-off insulating supports 35, 37. The movable terminals 31, 33 are in electrical contact with stationary terminal means or stabs 41, 43, respectively. Accordingly, an electrical circuit through the switchgear 11 extends from the stab 41 through the terminal 31, the vacuum circuit interrupter 39, the movable terminal 33 and the stab 43.

Figure 7:
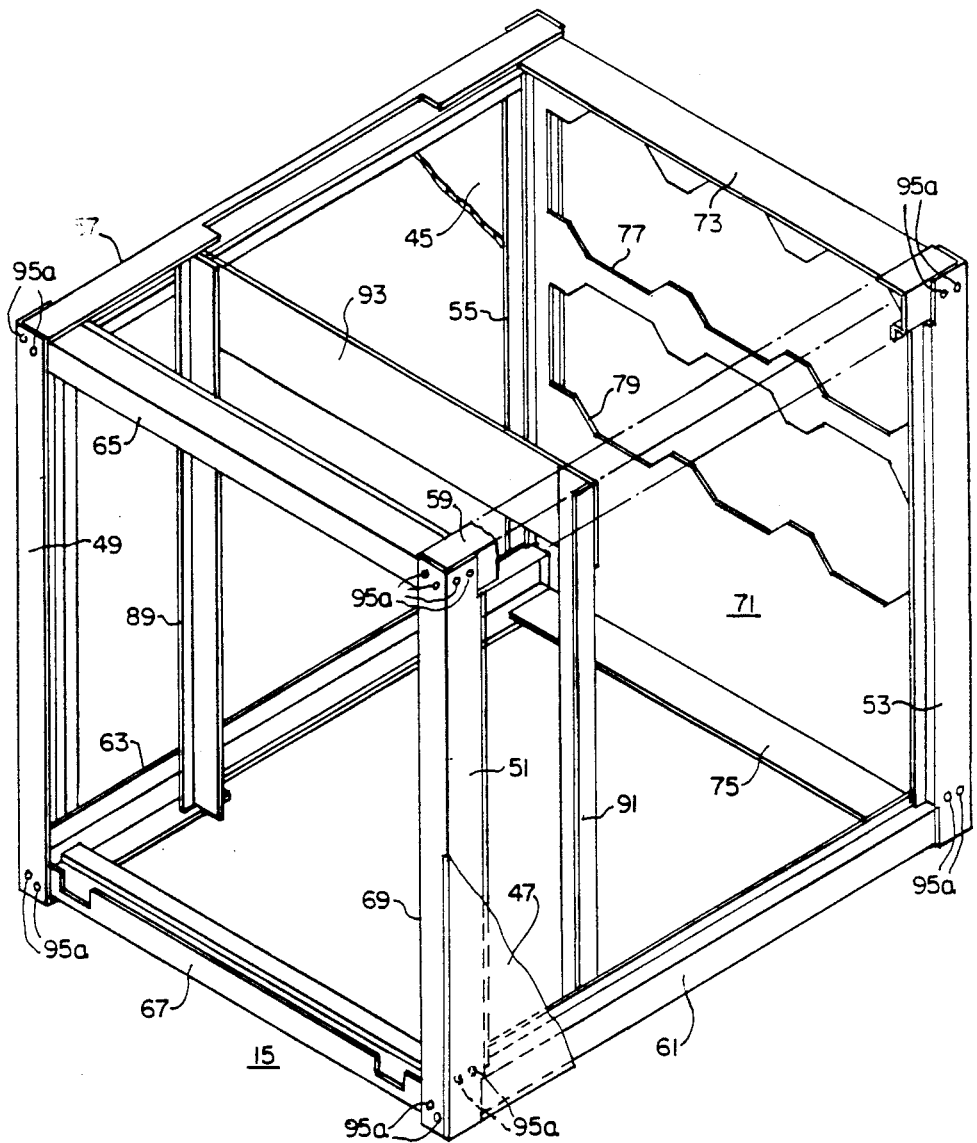
FIG. 7 is an isometric view of the drawout switchgear cell frame which incorporates a novel construction features of this invention.

The cell 15 comprises opposite side walls 45, 47 both of which are shown in FIG. 7. The cell 15 is preferably of rectangular configuration and is comprised of four vertical column members 49, 51, 53, 55, four horizontal members 57, 59, 61, 63, as well as two cross-strut members 65, 67. The vertical column members 49, 51 and the cross-strut members 65, 67 form a front opening 69 through which the circuit breaker 13 passes when it is drawn into and out of the cell 15.

A back wall 71 is disposed opposite the front opening 69 and is secured between vertical column members 53, 55. The back wall 71 is provided with an upper flange 73 and a lower flange 75 for rigidity and includes openings 77, 75 for accommodating a plurality of, such as three, pairs of stationary terminals or stabs, such as stabs 41, 43 (FIG. 1). Such stabs are mounted within suitable insulating supports 81, 83, such as glass, which include tubular portions 85, 87 which surround the assembly of the terminal in stabs 31, 41 and 33, 43, thereby isolating the assemblies from other phases and ground. Although the back wall 71 is provided as shown it is understood that members similar to the cross-strut members 65, 67 may be provided as substitutes where desirable for circuit breakers having different ratings, such as 1200, 2000, 3000 amperes. In addition to the members 49, 51, 53, 55, 57, 61, 63, 65, 67 forming the rectangular frame for the cell 15, other frame members 89, 91, 93 may be disposed in positions as shown suitable for supporting auxiliary parts contained within the cell.

Figure 8:
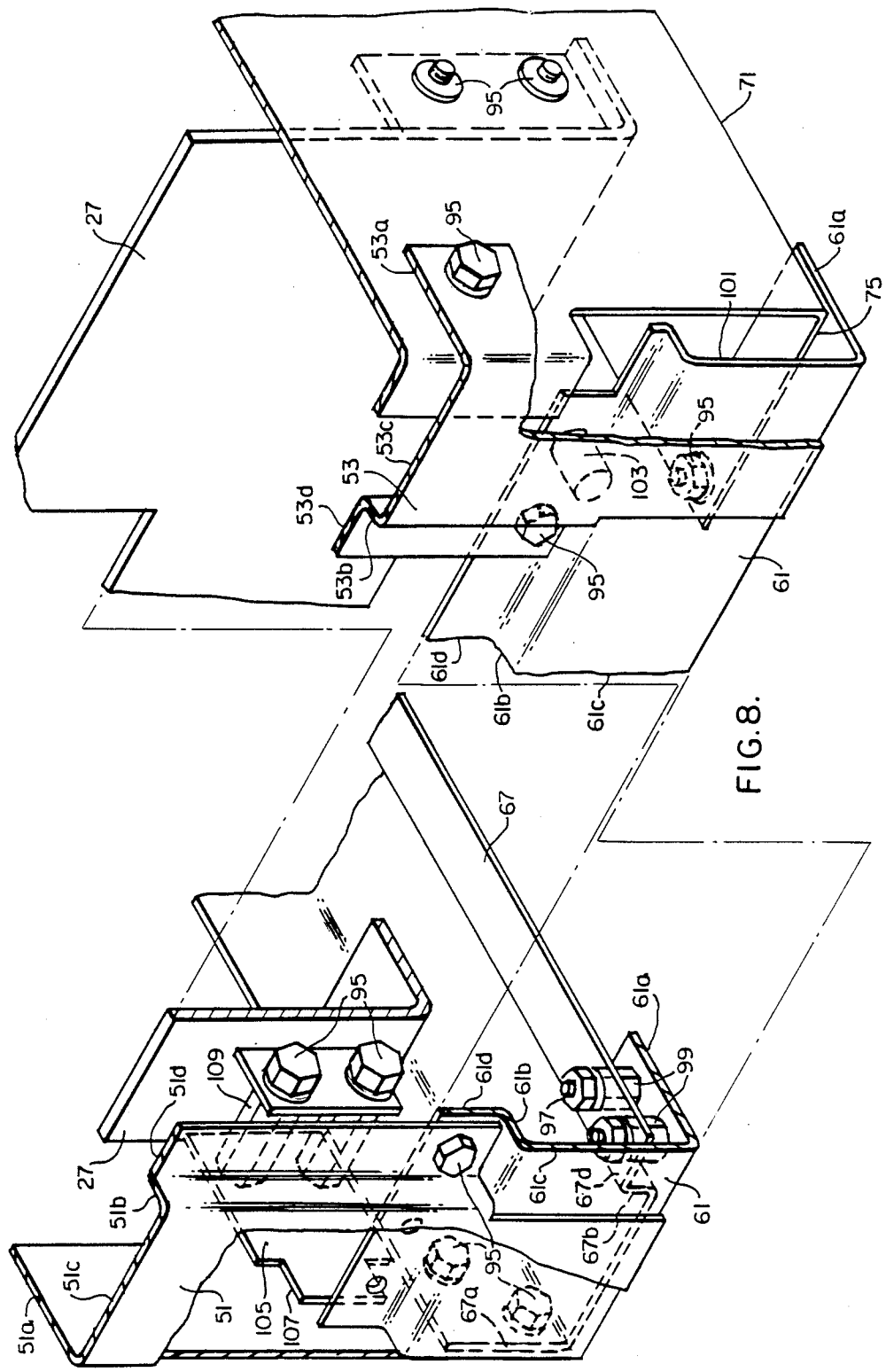
FIG. 8 is an enlarged fragmentary isometric view of the lower front and rear corner construction of the bolted frame shown in FIG. 7.

The frame corners or junctions are shown in FIG. 8. All of the members 49, 51, 53, 55, 57, 61, 63, 65, 67 are cut to the desired length from similar stock. They are of substantially U-shape configuration including U-legs and bight portion and have a lateral flange extending from one leg thereof. For example, a vertical column member 51 (FIG. 8) include U-legs 51a and 51b, a bight 51c, and a laterally extending flange 51d extending from the U-leg 51b. The lower end of U-leg 51b abuts a U-leg 61b and a bight 61c is in surface-to-surface contact with the bight 51c.

The upper and lower corners of the members forming the front opening 69 (FIG. 7) are secured together rigidly with suitable fastening means, such as bolt and nut assemblies 95. The end surface of the cross-strut member 67 (FIG. 8) is in abutment with the bight portion 51c of the vertical column member 51. Bolts 95 secure the U-leg 67a to the U-leg 51a (FIG. 8). Similarly, the end surface of the member 61 is in tight abutment with the U-leg 51a and is secured in place by nut and bolt assembly 97 together with spacers 99 extending between 61a and U-leg flange 67d of U-leg 67b. A nut and bolt assembly 95 secures the parts 51d and 61d together. A similar joint is provided at the rear corners where cross-strut members, such as 65 and 67, are disposed at the upper and lower corners of the frame. However, inasmuch as the back corners include the back wall 71, instead of cross-strut members, such as 65, 67, only the members 53, 61 (FIG. 8) are secured together similar to members 51 and 61. The end surface 101 is disposed rigidly against the U-leg 53a and a nut and bolt assembly 95 holds the flanges 53d and 61d together. A nut and bolt assembly (not shown) in conjunction with a spacer 103 secure the bight 53c and the flange 61d together. The lower end portion of the back wall 71 is secured in place against the U-leg 61a by a nut and bolt assembly 95 between the flange 75 and U-leg 61a.

Thus, the rigid assembly provides support for interior parts of the cell including a bracket 105 (FIG. 8) secured to the U-leg 51a in suitable manner, such as a weld 107. The bracket 105 supports one end of the track or rail 27 by means of bolt and nut assemblies 95 and similar spacers 109. The other end of the rail 27 is secured to the back wall 71 by nut and bolt assemblies 95. The cell includes sidewalls 45, 47 as well as a top wall 96 (FiG. 2) which are secured in surface-to-surface contact with the bight portions of all adjacent members. The bolts 95, disposed on the outer surfaces of the U-legs and bight portions, are flat and pressed into the surfaces of the associated bight or U-legs involved, so as to enable a continuous surface-to-surface abutment between the sidewalls 45, 47 and the adjacent members. For example, in FIG. 7 flat heads 95a are provided as shown. Other bolts 95, which are interior of the assembled members, may have conventional bolt heads.

In order to provide the necessary rigidity at the corners, the holes for the bolts in the several members are produced on a numerical controlled punch press, for which reason the assembly of the several corners is highly repeatable and accuracy of alignment and assembly is achieved without complex squaring features. Thus there is no need for corner gussets such as shown in prior art assemblies.

To move the circuit breaker 13 into and out of the cell or cubical 15, similar rail extensions 29 are attached to the rails 25, 27. As shown in FIGS. 4, 5, and 6 an end of the rail extension 29 is inserted in place with a notch 111 engaging a pin 113 when the rail extension is in the fully inserted position. The top edge of the rail extension 25 (FIG. 3) is aligned with the surface of the track within the cell, whereby the wheels or rollers 21, 23 enable transfer of the circuit breaker 13 between the rail extensions and the rails.

In addition, an interlock generally indicated at 115 (FIG. 4) is provided for preventing the circuit breaker 13 from being withdrawn from the cell without first placing the rail extensions 29 in place. The interlock 115 comprises a pair of links 117, 119 which are separately pivotally connected by bolts 121, 123 to the side of the rail 25. The links 117, 119 are coupled together by a pin 125 in a slot 127, which pin is on the link 119 and the slot is in the link 117. When the rail extension 29 is not in place, the interlock 115 is in the solid line position (FIG. 4) with an upper end 129 of the link 119 projecting above the surface of the rail and in the path of the wheel 23. Thus the interlock 115 prevents the circuit breaker from rolling out of the cell 15. When the rail extensions 29 are inserted in place, the pin 131 is engaged by an inclined surface 133 of the rail extension which lifts the interlock assembly upwardly to the broken line position with the pin 125 sliding in the slot 127. Thus, the upper end 129 is lowered to the broken line position, thereby enabling retraction of the circuit breaker 13 from the cell.

As shown in FIG. 1 when the circuit breaker is completely installed in the cell with the movable and stationary terminals 31, 33 and 41, 43 in engagement, the wheel or roller 23 is located within a notch 135 of the rail 25. In this manner, the wheel or roller 23 is retained in place against any disturbance due to the occurrence of a fault current during normal operations of the system.

As shown in FIG. 3 a shutter assembly including shutters 137, 139 is provided for safe operation of the circuit breaker. In the position of FIG. 3 with the circuit breaker 13 retracted from engagement with the stationary stabs 41, 43, the shutters 137, 139 are in a position of blocking the entrance of the movable terminals 31, 33 in place as shown in FIG. 1. In that position, the shutters 137, 139 are adjacent to an insulating barrier 141 which extends downwardly from a pair of retractable springs 143, one of which is mounted on each of the upper horizontal members 57, 59 where they are secured on a retractable spring assembly 143. The shutters are operated by a linkage system including a cam 145 and tube links 147, 149. As the circuit breaker 113 moves into the closed position with the stabs 41, 43, the wheel or roller 23 engages an inclined surface 151 of the cam 145 which is pivoted at 153. The right end of the cam 145 is pivotally connected at 155 to the lower end of the link 149, the upper end which is connected at a pivot 157 to the shutter 139 and to the link 147, the upper end of which is pivoted at 159.

As the cam 145 is rotated clockwise, the interconnecting links and shutters move to the positions shown in FIG. 1, whereby the shutters are open with the roller 23 in the notch 135. The upper surface of the cam 145 is in alignment with the rail 25 where it remains until the circuit breaker 13 is retracted, whereupon a spring 161 rotates the cam 145 counterclockwise to the position of FIG. 3. At the same time as the shutters 137, 139 move from the position of FIG. 3 to that of FIG. 1, the insulating barrier 141 is moved by breaker pushing against the spring return barrier assembly 143 against the outer ends of the tubular housings 85, 87 (FIG. 1).

Finally, the drawout switchgear units may be stacked (FIG. 3) with the corresponding terminals 41 interconnected as required by an interconnecting bus 163 which in turn is connected to a bus 165.

In conclusion, the drawout circuit breaker assembly of this invention provides for a novel structure that can be designed and manufactured into a switchgear assembly to suit a particular manufacturers complete line of equipment.

What is claimed is:

1. Drawout switchgear apparatus comprising:
   a. a cell having a front opening;
   b. stationary tracks within the cell;
   c. stationary terminals supported within the cell;
   d. a circuit breaker movable into and out of the cell through the front opening on the stationary tracks;
   e. movable terminals mounted on the circuit breaker and movable with the circuit breaker between connected and disconnected positions of the stationary terminals;
   f. the cell comprising formed column members disposed at outside corners thereof, formed cross-strut members, and formed horizontal members, said members having similar cross-sections of a substantially U-shape including U-legs and a bight, and having a laterally extending flange on one leg thereof, an end portion of each formed column member, cross-strut member, and horizontal member converging with one another to form a junction point, and fastening means for securing the members together at the junction point.

2. The apparatus of claim 1 in which the flange extends in a direction away from the other leg.

3. The apparatus of claim 2 in which each of said members comprise an end surface with the end surface of a first of said members being in abutment with the bight of a second member of said members.

4. The apparatus of claim 3 in which the end surface of said second member of said members is in abutment with a U-leg of a third member of said members.

5. The apparatus of claim 4 in which a U-leg of said first member of said members is in abutment with said U-leg of a said third member of said members.

6. The apparatus of claim 5 in which the fastening means comprises nut and bolt assembly.

7. The apparatus of claim 4 in which the abutting U-legs of said first and third members of said members are secured together, the laterally extending flanges of said second and third members of said members are secured together, and the flange of said first member and said U-leg of said second member are secured together.

8. The apparatus of claim 7 in which a track extension is detachable mounted on each track and extending through the front opening, whereby the circuit breaker may be removed from the cell.

9. The apparatus of claim 8 in which an interlock is retractably mounted on at least one of the tracks for blocking removal of the circuit breaker out of the cell when the track extension is removed from the track, an interengaging means are provided between the interlock and the track extension for disenabling and enabling the interlock when the track extension is disposed upon and separated from the track, respectively.

10. The apparatus of claim 9 in which the interlock comprises a body movable by the track extension into the path of movement of the circuit breaker when the track extension is removed.

* * * * *